United States Patent [19]
Kang et al.

[11] Patent Number: 6,087,621
[45] Date of Patent: Jul. 11, 2000

[54] METHOD FOR LASER HAMMERING A MULTI-CHANNEL OPTOELECTRONIC DEVICE MODULE

[75] Inventors: Seung Goo Kang; Min Kyu Song; Hee Tae Lee, all of Daejeon, Rep. of Korea

[73] Assignee: Electronics and Telecommunications Research Institute, Daejon, Rep. of Korea

[21] Appl. No.: 09/177,480

[22] Filed: Oct. 23, 1998

[30] Foreign Application Priority Data

Jun. 18, 1998 [KR] Rep. of Korea ............... 98-22958

[51] Int. Cl.[7] ................................. B23K 26/22
[52] U.S. Cl. ............................. 219/121.64; 219/121.85
[58] Field of Search ................. 219/121.64, 121.63, 219/121.85

[56] References Cited

U.S. PATENT DOCUMENTS

| | | | |
|---|---|---|---|
| 4,714,315 | 12/1987 | Krause | 219/121.63 X |
| 4,747,657 | 5/1988 | Chaoui et al. | 219/121.63 X |
| 4,838,639 | 6/1989 | Morankar et al. | 219/121.63 X |
| 5,222,170 | 6/1993 | Bargar et al. | 219/121.63 X |
| 5,367,140 | 11/1994 | Jouaneh et al. | 219/121.64 |
| 5,619,609 | 4/1997 | Pan et al. | |
| 5,673,350 | 9/1997 | Song et al. | |
| 5,745,311 | 4/1998 | Fukuoka et al. | 219/121.63 X |
| 5,938,951 | 8/1999 | Azdasht | 219/121.64 |

FOREIGN PATENT DOCUMENTS

| | | |
|---|---|---|
| 63-208008 | 8/1988 | Japan . |
| 5-60950 | 3/1993 | Japan . |

OTHER PUBLICATIONS

Jang, Soon, "Packaging of photonic devices using laser welding," SPIE vol. 2610, Oct. 1995, pp. 138–149.

Min Kyu Song et al., "Laser Weldability Analysis of High--Speed Optical Transmission Device Packaging", IEEE Transactions on Components, Packaging, and Manufacturing Technology, Part B, vol. 19 No. 4, Nov. 1996, pp. 758–763.

*Primary Examiner*—Gregory Mills
*Attorney, Agent, or Firm*—Jacobson, Price, Holman & Stern, PLLC

[57] ABSTRACT

A method for correcting or hammering a deformation which occurs in the multi-channel optoelectronic module and is caused by a post welding shift. The multi-channel optoelectronic module has an optical fiber support member for supporting an optical fiber array. The method includes the steps of: assembling the multi-channel optoelectronic module by using a laser welding process; and forming at least one welded portion on a predetermined position of said optical fiber supporting member corresponding to the deformation to thereby recover the deformation by using a shrinkage effect of the welded portion.

5 Claims, 4 Drawing Sheets

METHOD FOR LASER HAMMERING A MULTI-CHANNEL OPTOELECTRONIC DEVICE MODULE

FIELD OF THE INVENTION

The present invention relates to a method for laser hammering multi-channel optoelectronic device modules; and, more particularly, to a method for laser hamming multi-channel optoelectronic device modules, which is capable of effectively maintaining initial alignment for each channel signal.

DESCRIPTION OF THE PRIOR ART

Generally, in order to obtain an effective alignment between a multi-channel optoelectronic device and optical fibers, it is strongly required that an array is prepared by using a plurality of tapered optical fiber, each having a cladding of 250 µm in diameter. In this case, an aligning tolerance between the multi-channel optoelectronic device and the optical fiber is less than 10 µm in a z-axis direction.

In contrast, in x-axis and y-axis direction normal to the z-axis direction (z), if 1 µm is deviated from the optimum position, the optical coupling performance may be decreased more then 50% thereof. Therefore, the precise bonding and alignment technique is necessarily required. Especially, in order to obtain an optimum alignment for a multi-channel optoelectronic device, the optical fiber array should be adjusted in all directions, e.g., rotational directions Rx, Ry and Rz for each axis x, y and Z as well as x-, y- and z-axial directions.

An optoelectronic device module includes a submodule having an optical device, an optical fiber array mounted on a V groove substrate, and a module case. The optoelectronic device and the optical fiber array are first aligned in the module and then fixed by using a laser welding technique. And then the post welding shift (PWS) is adjusted and the adjusted submodule is then assembled in the module case.

Referring to FIG. 5, there is shown a perspective view of a conventional single-channel optoelectronic device module having an enlarged portion for the fixed portion of optical fiber.

The single-channel optoelectronic device module includes a submodule and a module case. As shown, in the submodule, a laser diode(LD) on a ceramic substrate 150 is fixed on a submodule substrate 140 by using a die bonding and a wire bonding techniques, and an optical fiber ferrule 110 is fixed through an optical fiber supporter 120 on the submodule substrate 140 through the use of a laser welding 161 and 162.

The submodule 140 has a project portion 141 on which a ceramic substrate 150 is mounted to thereby facilitate to align it with the optical fiber 101. On the other hand, a stainless 304L or KOVAR can be preferably used as a welding material in order to employ the laser welding.

The optical fiber is contained in the optical fiber ferrule 110 made of stainless 304L or KOVAR. In order to fix the optical fiber ferrule 110 on the submodule 140, the optical fiber ferrule 110 is positioned on the optical fiber supporter 120 and an active alignment for the optoelectronic device is performed in axial directions x, y and z. Thereafter, based on y-axis direction, the optical fiber ferrule 110 is fixed on the optical fiber support member 120 by the first laser welding process 161. And then, the active alignment for the optoelectronic device is newly performed in the axial directions x and z and then a secondary laser welding process 162 is provided to fix the optical fiber support member 120 on the submodule substrate 140. In this case, a solidification shrinkage is caused by light-metal interaction during the laser welding process, which often results in a weld shift leading to the reduction of both coupling efficiency and device throughput stability. This phenomenon is often referred to as the post weld shift(PWS) due to solidification shrinkage of the metal. In a conventional hammering method, a wrench for providing a mechanical force to the optical fiber ferrule 110 is employed to adjust the PWS in order to obtain good coupling efficiency.

The adjusted module is then assembled into the package case together with a number of peripheral components, e.g., a thermo-electric cooler(TEC). When the internal package case assembling process has been finished, the case lid is fixed by using a seam sealing to prevent the assembled internal components of the package from contacting the outer environment.

As can be seen from the above, in order to obtain good coupling efficiency, some mechanical tools, e.g., wrench, are generally employed to adjust the PWS. However, it is difficult to obtain a submicron-precision alignment through the use of the conventional mechanical hammering process. Furthermore, since a mechanical stress still remains in the welded portion, depending on the variation of temperature, the coupling efficiency of the completed optical switch module is decreased due to the remaining mechanical stress. Further, it is also difficult to obtain an adjustment in a rotational direction Rz about the z-axis through the use of the conventional mechanical process, wherein the Rz-rotational direction adjustment is necessarily required to prepare the multi-channel optical device module.

SUMMARY OF THE INVENTION

It is, therefore, an object of the invention to provide a method for laser hammering multi-channel optoelectronic device modules, which is capable of effectively maintaining initial alignment for each channel signal.

In accordance with one aspect of the present invention, there is provided a method for correcting or hammering a deformation which occurs in the multi-channel optoelectronic module and is caused by a post welding shift, wherein the multi-channel has an optical fiber support member for supporting an optical fiber array, comprising the steps of: assembling the multi-channel optoelectronic module by using a laser welding process; and forming at least one welded portion on a predetermined position of said optical fiber supporting member corresponding to the deformation to thereby obtain a laser hammering for compensating the deformation by using a shrinkage effect of the welded portion.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
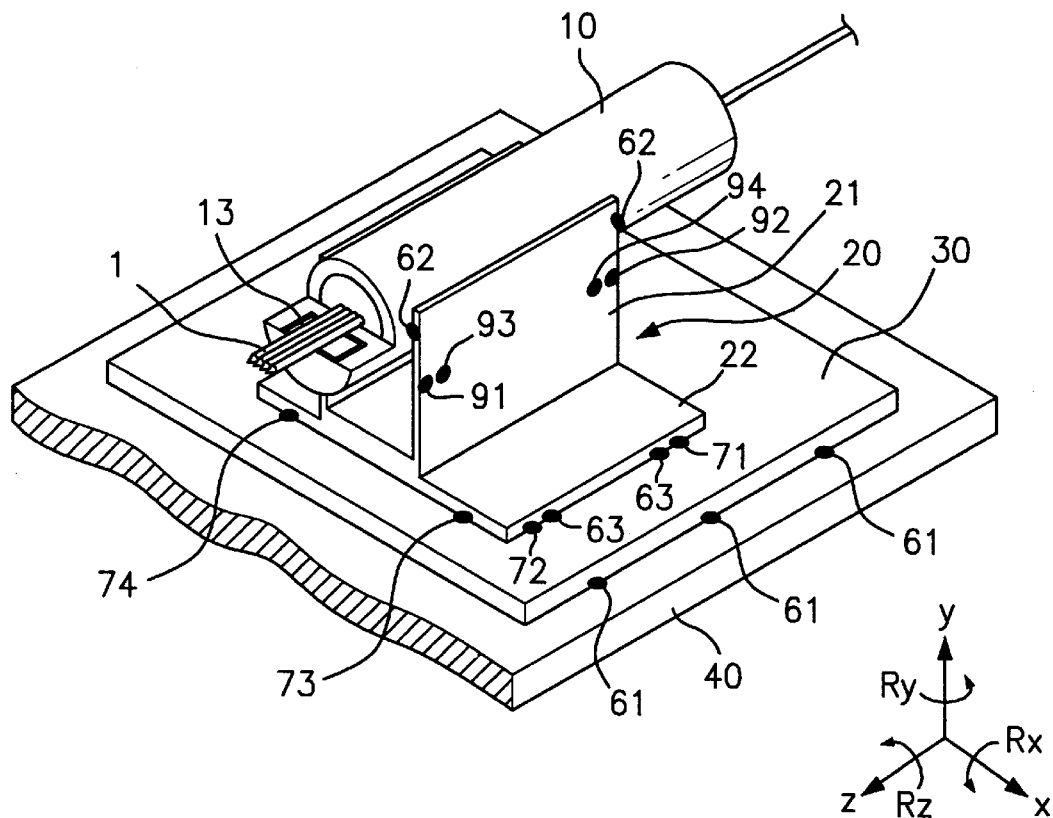
FIG. 1 shows a perspective view illustrating an alignment portion of a multi-channel optoelectronic device module in accordance with a preferred embodiment of the present invention.
Figure 2:
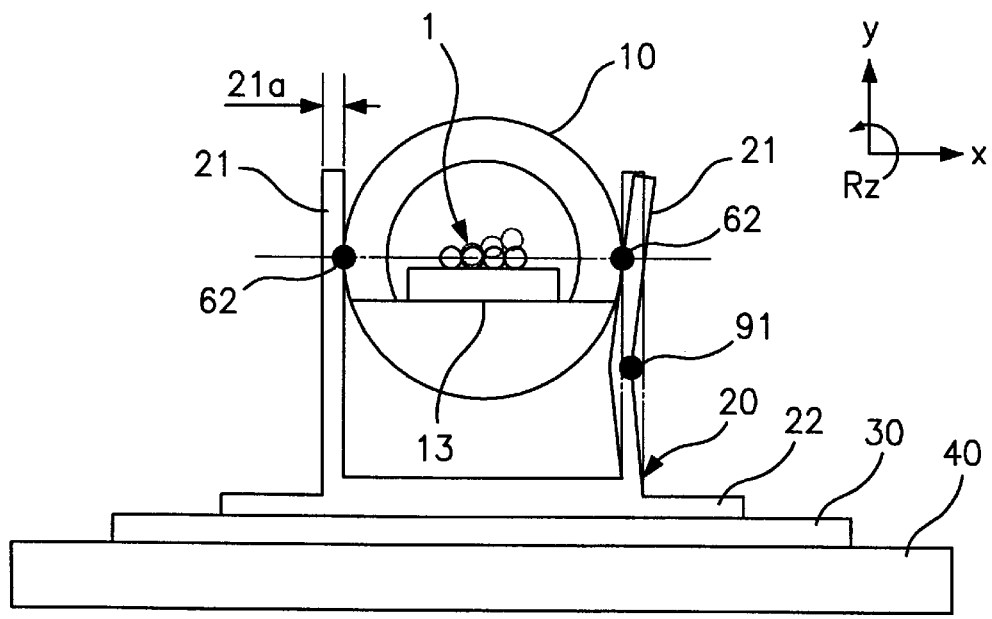
FIG. 2 discloses an elevational view depicting the alignment portion of the multi-channel optoelectronic device module in accordance with the preferred embodiment of the present invention.
Figure 3:
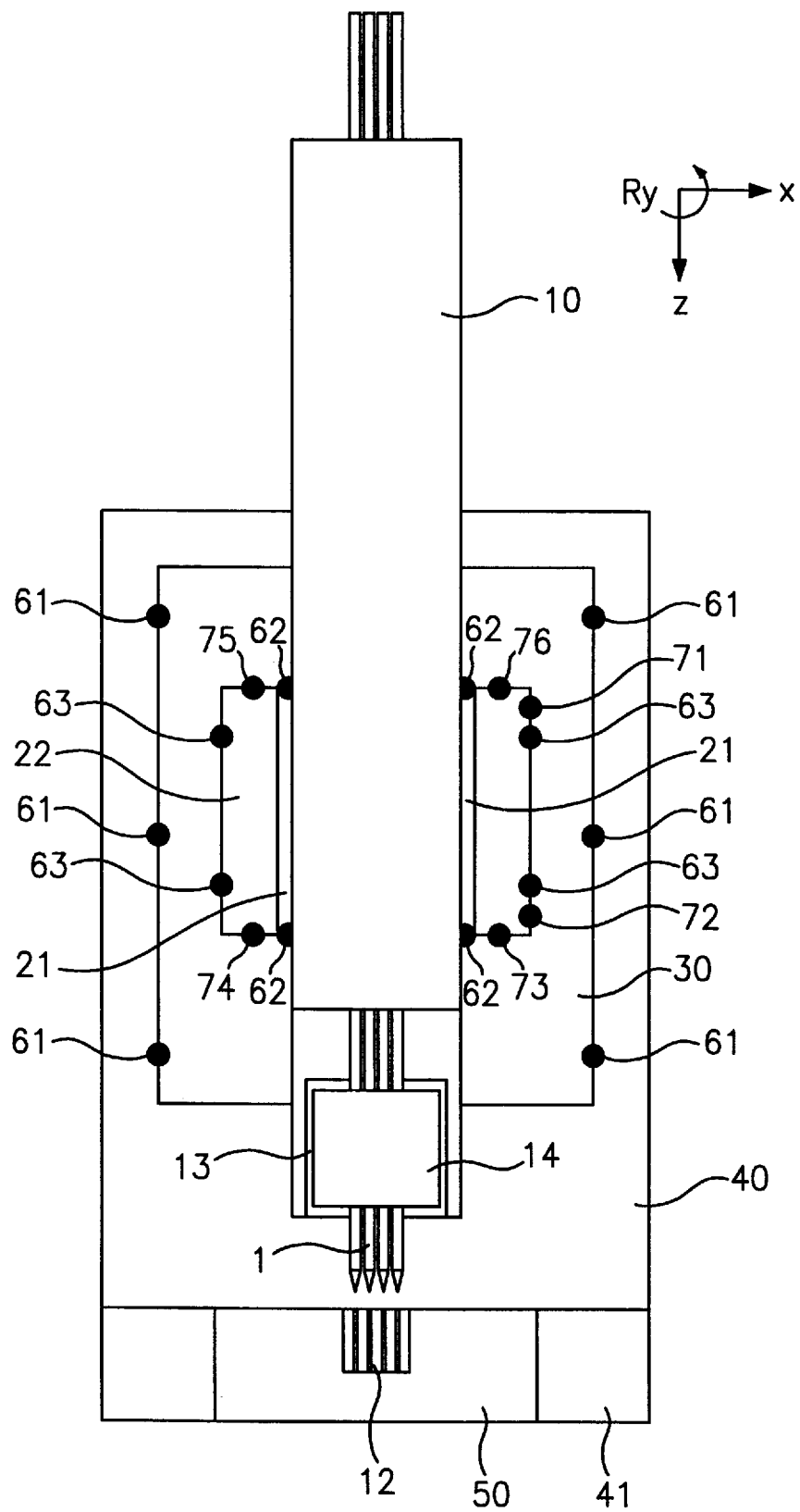
FIG. 3 describes a plan view of a submodule in accordance with the preferred embodiment of the present invention.
Figure 4:
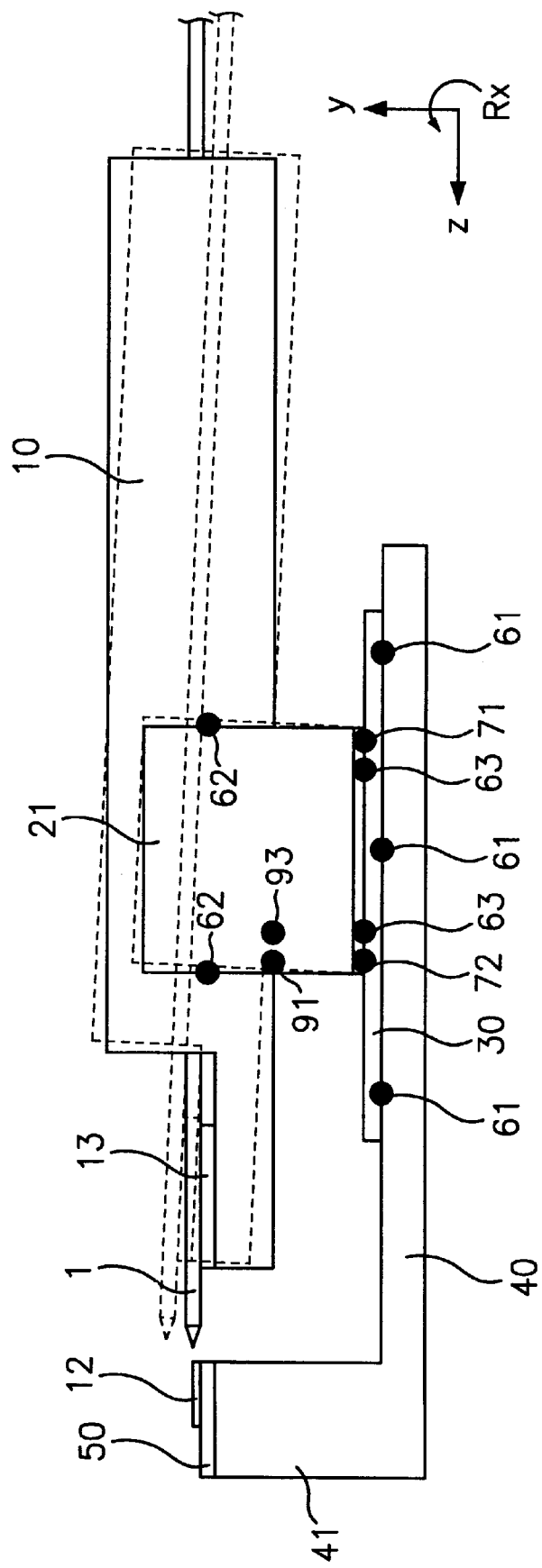
FIG. 4 illustrates a side view of the submodule in accordance with the preferred embodiment of the present invention.
Figure 5:
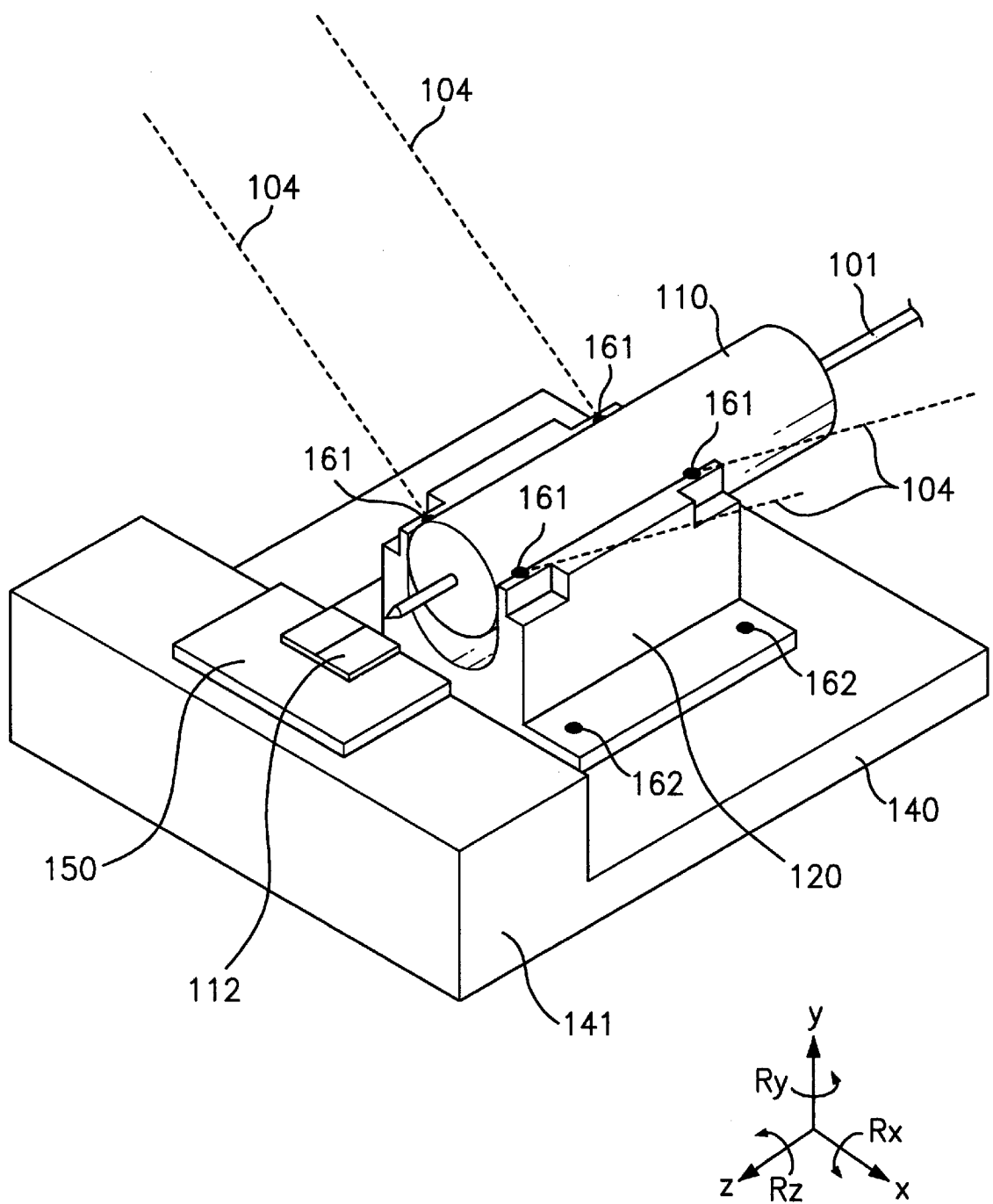
FIG. 5 demonstrates a perspective view of a conventional submodule contained a conventional single channel optoelectronic device module.

Referring to FIGS. 1 and 2, there are shown perspective and elevational views of an alignment portion of a multi-channel optoelectronic device module in accordance with a preferred embodiment of the present invention. FIGS. 3 and 4 illustrate plan and side views of a submodule of the multi-channel optoelectronic device module in accordance with the preferred embodiment of the present invention.

As shown, the multi-channel optoelectronic device module includes a submodule and a module case, wherein the submodule has a multi-channel optoelectronic device 12 and a tapered optical fiber array 1 assembled on a multi-channel V-groove substrate 13. For the sake of convenience, a module cap 14 is not shown in the FIGS. 1, 2 and 4.

In the submodule, the optoelectronic device, e.g., a laser diode 12 on a ceramic substrate 50 is fixed on a submodule substrate 40 by using a die bonding and a wire bonding, and a base plate 30 is fixed on the submodule substrate 40 through welded portions 61 made by using a laser welding. An optical fiber ferrule 10 is aligned through an optical fiber support member 20 on the base plate 30 in order for the tapered optical fiber array to obtain maximum coupling efficiency and then fixed through welded potions 62 and 63 made by using the laser welding.

Thereafter, a hammering process is performed to correct a post weld shift(PWS) due to solidification shrinkage of the welding area. The adjusted submodule is then finally assembled in the module case.

In accordance with the present invention, it is addressed to a laser hammering method, employing shrinkage effects on the welded portions, for recovering the lost coupling efficiency caused by PWS along all of directions including not only x-, y- and z-axis directions but the rotational directions Rx, Ry and Rz for each axis.

In order to perform the laser hammering process, the optical fiber support member has two support plates 21, each of which is integrally perpendicular to the bottom plate 22 in one structure. Each support plate 21 has a thickness in the range from 300–400 $\mu$m and can be shrunk or deformed by the laser welding to thereby effectively adjust the PWS of the module. Referring to FIGS. 3 and 4, the method for preparing the multi-channel optoelectronic device module is described hereinafter.

Process 1:

A ceramic substrate 50 is fixed on a project portion 41 of the submodule substrate 40 by using a soldering and the semiconductor multi-channel optoelectronic device 12 is then fixed on the ceramic substrate 50 by using the die bonding and the wire bonding.

Process 2:

The submodule substrate 40 is gripped by the lower tooling of a laser welding system(not shown) and the base plate 30 is then positioned on the submodule substrate 40. Thereafter, the base plate 30 is fixed thereon through 6 number of welded portions made by the YAG laser having a power of about 5–7 Joule per a beam. In this case, the base plate made of SUS304L is used on the submodule substrate made of Cu—W because Cu—W has good thermal conductivity but does not have a laser weldablity. The reason for using the base plate made of SUS304L is that the optical fiber ferrule 10 and the optical fiber support member 20 commonly made of SUS304L can be easily solidified on the base plate 30, wherein the optical fiber array 1 is surrounded or secured by the optical fiber ferrule 10 which is supported by the optical fiber support member 20.

Process 3:

The optical fiber support member 20 is located on the base plate 30. Thereafter, the optical fiber ferrule 10 is gripped by tooling which provide movements in all directions, e.g., x-, y- and z-axis directions and rotational directions Rx, Ry and Rz for each axis and the active pre-alignment process is activated.

Process 4:

In order to fix the pre-aligned optical fiber array 1 in the y-axis direction, portions between the optical ferrule 10 and the optical fiber support member 20 are first welded by using a laser having an energy of about 3–5 Joule per a beam to thereby form 4 number of welded portions 62. Thereafter, in order to fix the pre-aligned optical fiber array 1 in the x- and z-axis direction, the precise active alignment process is performed and portions between the optical fiber support member 20 and the base plate 30 are then solidified by the laser to thereby form 4 number of welding portions 63.

However, in the above process, there is a solidification shrinkage after the laser welding process. That is, the solidification shrinkage is caused by the light-metal interaction during the welding process and referred to as the post weld shift(PWS), wherein the PWS often results in a weld shift leading to the reduction of both coupling efficiency and device throughput stability. In accordance with the present invention, the inventive laser hammering method employs the solidification shrinkage property to thereby effectively correct the PWS, instead of using a conventional mechanical hammering process.

The inventive laser hammering process is described hereinafter.

1) Laser Hammering Method for Correcting a Deformation in x-axis Direction:

As shown in FIG. 3, portions 71 and 72 located on the bottom of the optical fiber support member 22 is additionally welded by the laser welding process so that the laser hammering for compensating the coupling loss in x-axis direction can be easily achieved due to the solidification shrinkage effect. If the desired hammering is not obtained by the laser welding, additional portions thereof can be welded until the desired hammering is achieved. Furthermore, the amount of the solidification shrinkage can be controlled depending on the power of the employed laser. On the other hand, in order to obtain the hammering in x-axis direction, two potions 71 and 72 located on upper and lower points in a same line should be simultaneously welded. If one of the two portions is welded, the hammering effect in rotational direction Ry for the y-axis can be obtained. Therefore, if the front portion of the optoelectronic device 12 is not parallel to the front portion of the optical fiber array, it can be hammered by welding one of portions 71 and 72.

2) Laser Hammering Process for Correcting a Deformation in z-axis Direction:

This is similar to the x-axis laser hammering process. That is, in order to correct a deformation in z-axis direction to thereby move the optical fiber array 1 toward the optoelectronic device 12, two portions 73 and 74 located on the front portion of the bottom of the optical fiber support member 22 are welded by the laser. On the other hand, in order to move the optical fiber in an opposite direction, two portions 75 and 76 on the behind portion thereof can be welded.

In this case, a space between the optoelectronic device 12 and the optical fiber array 1 is only in the range from about 10 to 15 μm. Therefore, the power of the laser should be reduced as about 3 Joule/beam in order to prevent the optical fiber array 1 from contacting the optoelectronic device 12. On the other hand, when one of two portions (73, 74) or (75, 76) is welded, a hammering effect in rotational direction Ry for the y-axis can be obtained.

3) Laser Hammering Process for Correcting a Deformation in y-axis Direction:

As shown in FIG. 4, a deformation designated by using a phantom line represents that the optical fiber array 12 is located over the optoelectronic device 12. In order to correct the deformation to thereby coincident the height of the optical fiber array 1 with that of the optoelectronic device 12 as shown by using a solid line, a portion 91 located on the front-center portion of the support plate 21 is welded by using the laser. In this case, as shown in FIG. 2 by using a phantom line and a solid line, the support plate 21 having an initial straight shape is slightly bended due to the shrinkage effect. The amount of the shrinkage can be controlled by adjusting the power of the laser to thereby effectively obtain a precise hammering, e.g., about 0.1 to 0.2 μm. If the desired hammering is not obtained by the laser welding, additional portions 93 thereof can be welded until the desired hammering is achieved. On the other hand, in order to rise up the front portion of the optical fiber array 1 to thereby obtain a z-axis directional hammering, a portion 92 located on the rear-center portion of the support plate 21 is welded by using the laser. On the other hand, in order to control the height of the optical fiber array 1, two portions located on same position of two support plates should be simultaneously welded. In this case, a rotational effect may occur in Rx-direction, but it does not affect overall alignment.

4) Laser Hammering Process for Correcting a Deformation in Rz-rotational Direction for the x-axis:

Referring to FIG. 2, when the optical fiber support 20 is welded in order to solidify the optical fiber array 1, the post welding shift necessarily occurs in Rx-rotational direction as designated by a phantom line. That is, it is difficult for all channels to obtain uniform coupling efficiency due to the post welding shift. The post welding shift in Rz-rotational direction should be precisely adjusted so that it is impossible to correct it by using the conventional mechanical hammering process to thereby obtain a stable multi-channel optoelectronic module. In accordance with the present invention, in order to obtain the Rz-rotational direction hammering, two portions 91 and 93 located on the middle portion of one support plate 21 are simultaneously welded by the laser as a hammering process. If the desired hammering is not obtained by the laser welding, additional portions thereof can be welded until the desired hammering is achieved.

Additionally, the above process can be performed in order to achieve all directional precise hammering.

As can be seen from the above, the laser hammering process in accordance with the present invention effectively provides a precise correction for the deformation in all direction to thereby obtain a stable and reliable multi-channel optoelectronic module in a cost-effective manner.

While the present invention has been shown and described with reference to the particular embodiments, it will be apparent to those skilled in the art that many changes and modifications may be made without departing from the spirit and scope of the invention as defined in the appended claims.

What is claimed is:

1. A method for correcting or hammering a deformation which occurs in a multi-channel optoelectronic module and is caused by a post welding shift, wherein the multi-channel optoelectronic module has an optical fiber support member for supporting an optical fiber array, comprising the steps of:

assembling the multi-channel optoelectronic module by using a laser welding process; and forming at least one welded portion on a predetermined position of said optical fiber supporting member corresponding to the deformation to thereby recover the deformation by using a shrinkage effect of the welded portion;

wherein the predetermined position is determined in correspondence with all of deformations in x-, y- and z-axis direction and rotational directions Rx, Ry and Rz for each axis.

2. The method as recited in claim 1, wherein said assembling step includes the step of laser-welding an optical fiber ferrule surrounding the optical fiber array on the optical fiber support member, wherein the optical fiber support member has two support plates for supporting the optical fiber ferrule through welded portions, each support plate having a thickness in the range from 300 to 400 μm.

3. The method as recited in claim 2, wherein the forming step includes the step of, in order to slightly drop a front portion of the optical fiber array, forming a welded portion located on a middle position of a front edge portion of the optical fiber support plates; and, in order to slightly rise up the front portion of the optical fiber array, forming a welded portion located on a middle position of a rear edge portion of the optical fiber support plates.

4. The method as recited in claim 2, wherein the forming step includes two welded portions located on middle positions of the front and the rear edge portions of one optical fiber support plate in order to compensate the Rz rotational deformation along z-axis.

5. The method as recited in claim 1, wherein the forming step includes the step of forming an additional welding portion about the predetermined position of the optical fiber supporting member.

\* \* \* \* \*